Patented Nov. 22, 1949

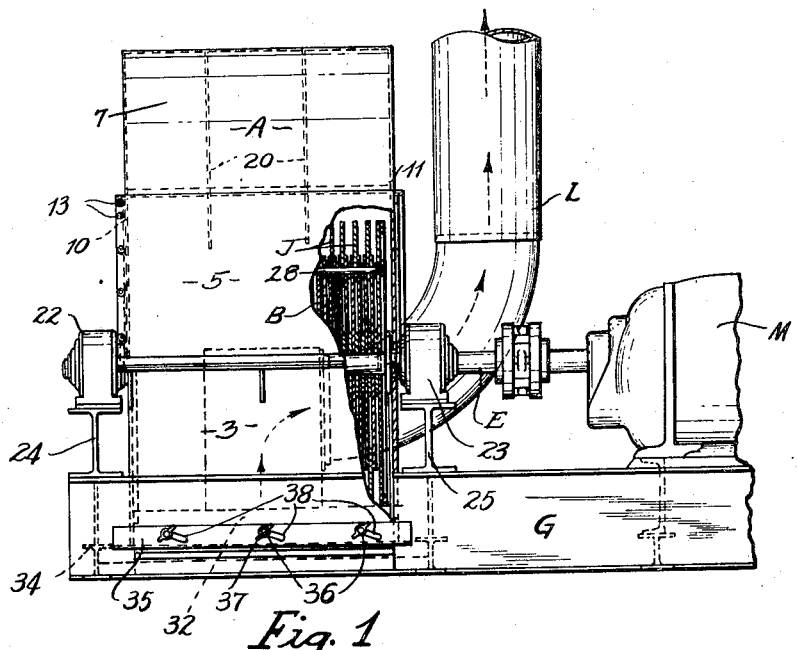

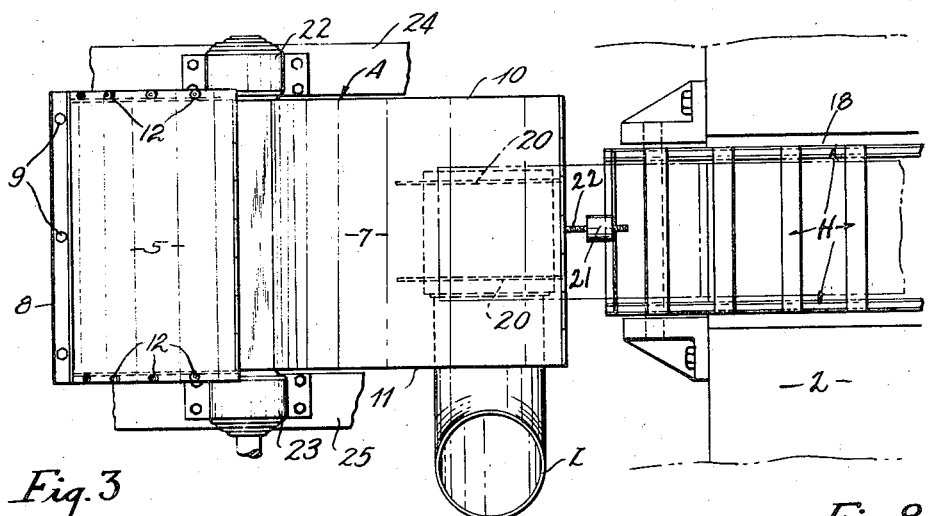
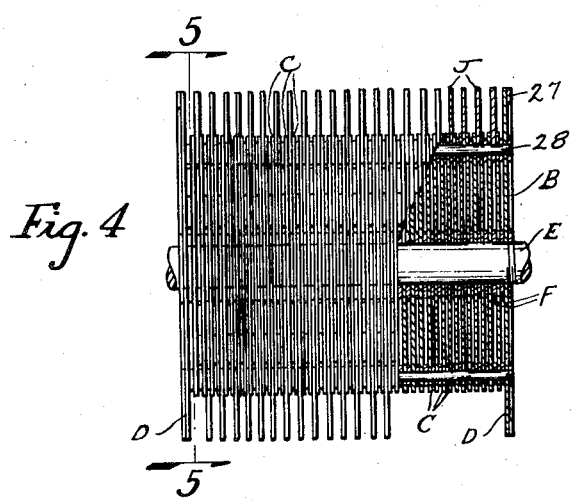
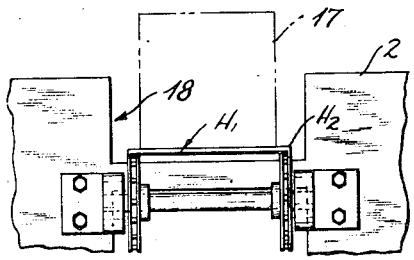
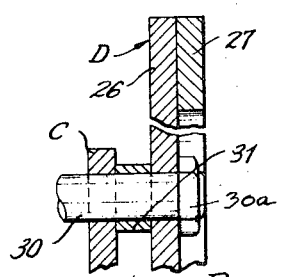
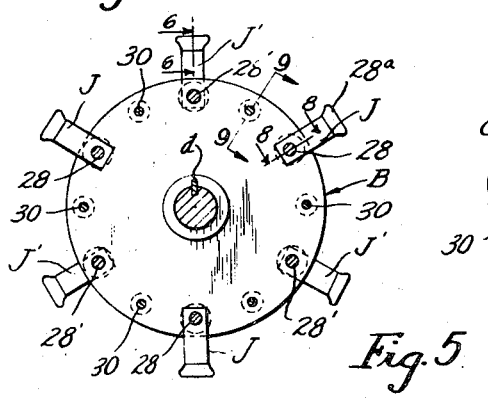

2,488,799

UNITED STATES PATENT OFFICE 2,488,799

SWING HAMMER TYPE MILL WITH FEED MEANS FOR BALED MATERIAL

Paul Bonnafoux, Lancaster, Calif.

Application February 19, 1945, Serial No. 578,681

2 Claims. (Cl. 241—60)

This invention relates to hammer mills for pulverizing hay and the like for providing animal foods.

So-called hammer mills are well known in the art of food production, especially food for animals and have heretofore been useful only for receiving relatively small bundles or sheafs of hay derived, sheaf by sheaf, from bales of hay, thereby requiring an unnecessary labor cost and a crew of several workmen for each mill and also limiting the production of the mill to the speed and capacity of the workmen. It is, therefore, an important object of the present invention to provide a mill which is capable of receiving bales instead of sheaves of hay at each feeding operation and to which the bales are automatically fed in continuous procession and in single file to the mouth of the mill while being moved by power into cutting engagement with the hammers, thereby substantially reducing the number of workmen in a mill crew and effecting a corresponding reduction in the cost of milling operations.

Conventional mills include a rapidly rotating rotor composed of a plurality of discs spaced apart axially with usually not to exceed three hammers pivotally supported on each disc. The mills are usually geared to a speed of approximately 1500 revolutions per minute and when a mill has, for instance, forty discs each with three hammers thereon the mill will produce a total of 3000 impacts per second or 180,000 impacts per minute which has been found reasonably satisfactory, but it is an object of my invention to substantially increase the number of impacts per revolution as, for instance, by employing two groups of three hammers each carried by each of the rotor discs with the hammers of the separate groups rotating in parallel planes and with the axes of all of the hammers on each disc uniformly spaced apart arcuately so that hammers in each group will be disposed at 120 degrees apart while adjacent hammers of the two groups will be spaced but 60 degrees apart. Thus, each disc will provide a total of six impacts per revolution or three impacts for each of the two adjacent planes per revolution.

Other objects include: the provision of a turbulence chamber immediately above the point where the hay engages with the hammers; provision of means at the rear of the turbulence chamber for affording access to the mill; a suitable conveyor for moving the bales of hay in succession to the mill; means for holding the bales of hay in feeding position; means for continuously removing the products of the mill for delivery to desired location for the purpose of further treatment or otherwise; means for affording access to the rotor for any purpose; and means for separating and collecting any metallic elements which may have entered the mill with the baled hay. Still other objects may appear as the description of my improved mill progresses.

I have shown a preferred form of mill embodying my invention in the accompanying drawings in which:

Fig. 1 is a rear elevation, partly in section;

Fig. 2 is a sectional elevation at right angles to the plane of Fig. 1;

Fig. 3 is a plan view, partly in section;

Fig. 4 is a side elevation of the rotor, partly in section on line 4—4 of Fig. 2;

Fig. 5 is a sectional view of the same on line 5—5 of Fig. 4;

Fig. 6 is a fragmentary cross-section of one of the hammers;

Fig. 7 is a fragmentary elevation of a conveyor adapted for moving bales of hay in single file into the mill;

Fig. 8 is an enlarged fragmentary section as seen on line 8—8 of Fig. 5; and

Fig. 9 is an enlarged section of the rotor on line 9—9 of Fig. 5.

Briefly described, my improved mill includes: a suitable housing A in which a rotor is operatively mounted and formed of a plurality of hammer carrying discs C and a pair of end discs D, D, which are commonly mounted on a driven shaft E adapted to be operated by a motor M. The assembled mill and the motor F are mounted on a subframe G usually positioned in a pit, the floor 1 of which is substantially below the level 2 of the floor of a room in which the mill is mounted. The mill housing includes a rear wall 3 and a front wall 4 which extend upwardly to a plane about level with the axis of shaft E, a rear door 5 which is hinged at its top as at 6 to a curved top portion 7 and has its lower edge detachably connected with a flange 8 as by means of bolts 9 and additionally attached to end walls 10 and 11 as by means of swivel latches 12 pivotally carried on said end walls at a plurality of spaced points and held by nuts 13. Immediately above shaft E I provide a reinforcing bar 14 at the joint between the door 5 and upper wall 7 which is preferably welded to wall 7 and serves to prevent erosion at this point which may be occasioned by the impact of particles of material and a resultant fracture in the housing. It will be evident that the space between the bar 14 and the tips of the rotor teeth is such that any clumps of material torn from the bale will be broken up at this point.

Wall 7 and the ends 10 and 11 extend upwardly so as to form above the mouth of the mill a turbulence chamber 15 extending over the forward end of the bale being milled and which is closed by means of a front door 16 extended downwardly to a plane but slightly above the upper surface of a bale 17 of hay which, as shown in Fig. 2, is delivered to the mill at the front by means of a conveyor H. Said conveyor extends substantially forwardly of the mill and the upper portion thereof moves in a trough 18 formed in and extended below the floor 2 so that the uppermost position $H_1$ of the conveyor will move over the floor of the trough in the direction of the mill for delivering bales of hay in single file formation continuously to the mill while the lowermost portion thereof will move beneath said floor. The conveyor preferably has a plurality of uniformly spaced cross bars $H_2$ thereon upon which the bales of hay rest during their transit to the mill. A plate 19 is provided between the end of conveyor H and rotor B over which the bales of hay are moved through the mouth of the mill into position for engagement with the hammers or cutters of the rotor.

The front end of the mill housing is provided with two or more plates 20 which may be suitably attached to the mill housing and are disposed edgewise so that their lower edges will overlie and engage the top surfaces of the bales of hay 17 as the same enter the mill, thereby preventing the raising of the bales when attacked by the hammers of the rotor as the rotor is moved in a counterclockwise direction, as shown in Fig. 2. Door 16 carries a weight 21 which is adjustable on a screw 22 for the purpose of holding the door normally closed even against the back pressure in chamber 15 but permitting ready access to said chamber whenever it may be desired or necessary.

Rotor B is of composite character with the discs C mounted in spaced positions thereon and its shaft E supported in bearings 22 and 23 adjacent walls 10 and 11, respectively, and attached to cross beams 24 and 25 which are superposed on and attached to frame G. The discs C and D of the rotor are connected as one unit with the end discs D suitably keyed as at $d$ in Fig. 5 or otherwise attached to the shaft E and the intermediate hammer carrying discs C connected at a plurality of points with each other and with the discs D, as shown in Figs. 5, 8 and 9 in detail. Discs D are each formed with solid portions 26 and annular portions 27 welded or otherwise permanently attached thereto on their outer sides. Discs C are of substantially smaller diameter than discs D and are uniformly spaced apart from each other and from discs D as by center washer F, as shown in Fig. 4. By reference to Fig. 5 it will be observed that each disc C carries six hammers arranged in two groups J and J' with the hammers of each group spaced apart around the discs to an extent of one hundred and twenty degrees or sixty degrees between adjacent hammers of the two groups. One group of hammers is mounted on one side and the other group on the opposite side of each disc C on longitudinal rods 28 and 28', respectively. As shown in Fig. 8, three hammers J are mounted on the right hand side of a disc C and are pivotally held on rods as at 28 and spacers 29 are provided between hammers J and the adjacent disc C. Similarly rods 28' support hammers J' on opposite sides of discs C in positions alternating with those of hammers J. The hammers J and J' are of similar form and are pivoted on the rods 28 and 28', respectively, so that they may freely swing to operative position by centrifugal force set up by the rapid rotation of rotor B. Each hammer has an end portion 28a welded thereto which is formed of an extremely hard metal such as tungsten carbide which projects from the outer end and laterally of the hammer for increasing the life of the hammer. It is well known that the hammers in a mill of the character shown herein wear rapidly because of the friction between the exposed hammer portions and the material being milled and they become ineffective for use after a relatively short period of time. Hence, by means of the provision of the reinforced ends I have found that the hammers are effective for far longer periods than when otherwise formed.

Alternately spaced around discs C and D relative to rods 28 and 28' are other rods 30 (shown in Figs. 5 and 9) which extend through all of said discs and have nuts 30a externally of discs D and within the central spaces of rings 27 forming parts of said discs D. Said rods 30 carry spacers 31 between discs D and adjacent discs C and also between adjacent discs C.

In Fig. 2 I have shown a semicircular screen K which may be of wire mesh or in the form of a perforated plate and underlies the rotor B whereby the pulverized material is sifted through the screen and deposited in a receiving chamber 32 below the rotor from which the milled material is blown by the rotor through a forwardly directed passage 33 upwardly into a pipe L for delivery to a desired point for further treatment or disposition. I may provide, if desirable, an elongated aperture 34 in the rear wall 3 of the mill housing for admission of air from the atmosphere in order to increase the draft and effect a complete evacuation of the milled products from chamber 32 and in such case a closure 35 may be provided on the outer side of wall 3 which is adjustable over the aperture 34 and held in adjusted position as by means of nuts 36 threaded on bolts 37 extending through inclined slots 38 in said closure. Beneath the exhaust passage 33 I provide a transversely slidable drawer 39 into which may fall during the operation of the mill any and all relatively heavy foreign matter such as small pieces of metal, stones or other elements which may have been accidentally and unintentionally collected when the hay was garnered and baled or as may be occasioned by any other act or means.

Preferably at each end of the mill I provide in the walls 10 and 11 an opening 40 which is covered by a plate 41 (Fig. 2) and registers with the circle which cuts the axes of the tie rods 28, 28' and 30 whereby said rods may be removed and replaced at will without disassembling the rotor or occasioning its removal from the housing.

Now, it will be observed by reference to Fig. 2 that the axis of rotor B is substantially in the horizontal plane of the portion $H_1$ of conveyor H and the receiving plate 19. Hence, as bales 17 of hay or the like, following removal of the usual baling wires therefrom, are moved by the conveyor onto plate 19 and thence over plate 19 and under the lower edges of plates 20 the hammers J and J' will successively and forcibly engage the forward face of the bales and disconnect and cut succeeding portions of the bales and due to the rapidity of motion of the hammers will break up the strands of hay into minute particles, such particles first being subjected to a whirling movement within chamber 15 and then being carried around the rotor by the generated suction and then discharged through the screen K into chamber 32 from which they are continuously exhausted through passage 33 and pipe L. The mill herein shown and described is capable of pulverizing material to an extent of approximately fifty tons per day of a given mesh requisite for feeding of certain animals but when a finer mesh is required for other types of animal food the products of the mill are withdrawn through pipe L and delivered to another or other mills for finer grinding.

The mill is fed by one or more workmen who deposit the bales of hay or alfalfa on conveyor H in trough 18 after having first, or later, removed the baling wire therefrom and the conveyor may be of any suitable length which will insure a continuous movement of untied baled hay to the mill. It is obvious that the conveyor may be driven from the shaft E or by means of an independent motor at a speed of from two to six feet per minute, depending upon the size and capacity of the mill which is varied by the number and diameter of the rotor discs and the number and rotative speed of the hammers. The purpose of the turbulence chamber is to deflect backwardly heavier particles such as clumps of material and pieces of rake teeth or other relatively large metal pieces. The clumps of material are disintegrated by rapid whirling in the turbulence chamber while pieces of metal and the like are thrown downwardly on the upper surface of the forward end of the bale and are readily removed by the momentary opening of door 16 by lifting weight 21 and manually removing the object.

I claim:

1. A hammer mill for milling bales of alfalfa and other material including: a housing; a rotor mounted horizontally within said housing and formed of a plurality of closely spaced discs each provided with a plurality of hammers pivoted to the perimeter thereof in staggered relation; a turbulence chamber extending from said housing over the forward end of the bale being milled; an erosion resistant member extending axially of the rotor at the junction of the housing and turbulence chamber; a substantially horizontal feed conveyor delivering material in baled arrangement against the periphery of said rotor so that bunches of material removed from the forward face of the bale and heavy pieces of foreign matter baled with the material are deflected backwardly in the turbulence chamber while smaller particles and material are moved forwardly by the rotator; means for rotating the rotor in a direction which cause the hammers to move upwardly into engagement with the baled hay adjacent the discharge end of the conveyor; a door pivoted to the forward wall of the turbulence chamber over the forward end of the bale being milled; means biasing said door toward closed position with the lower edge thereof abutting the top of the bale but enabling the door to be readily opened to remove foreign objects thrown on the bale; means holding the forward end of the bale against upward movement under the impact of the hammers; a screen through which the milled product falls; a conduit for removing the milled product by a current of air from below said screen; and a trap positioned below the level of the lower wall of said conduit into which heavier particles than the milled product fall by gravity and collect for removal.

2. A hammer mill comprising: a housing formed with a mouth for receiving successive bales of hay, or the like, for pulverization; a rotor arranged within said housing, a plurality of freely pivoted hammers carried by said rotor, a conveyor arranged to deliver bales of hay to said rotor in the horizontal plane of the rotor axis and perpendicular to the operative surface of the rotor so that the hammers carried by the rotor pulverize the bales in succession by cutting into the face of the bales, and a door secured to the housing at the receiving portion of the housing and formed to project into proximity with the bales entering the housing, and a pair of spaced vertical plates mounted within said housing adjacent said door and positioned to engage the tops of bales of hay or the like by their lower edges for opposing upward movement of the forward ends of the bales caused by action of the hammers as the bales are fed to the rotor on said conveyor.

PAUL BONNAFOUX.

REFERENCES CITED

The following references are of record in the file of this patent:

UNITED STATES PATENTS

| Number | Name | Date |
|---|---|---|
| 372,157 | Lawton | Oct. 25, 1887 |
| 392,488 | Behm | Nov. 6, 1888 |
| 860,916 | Harrison | July 23, 1907 |
| 906,670 | Wise | Dec. 15, 1908 |
| 1,013,611 | Peters | Jan. 2, 1912 |
| 1,339,950 | Fowler | May 11, 1920 |
| 1,410,455 | Campbell | Mar. 1, 1922 |
| 1,713,957 | Duvall | May 21, 1929 |
| 1,751,009 | Liggett | Mar. 18, 1930 |
| 1,787,828 | Levin | Jan. 6, 1931 |
| 1,828,490 | Clement | Oct. 20, 1931 |
| 1,828,987 | Stresau | Oct. 27, 1931 |
| 1,844,279 | Gossard | Feb. 9, 1932 |
| 1,862,889 | Elzemeyer | June 14, 1932 |
| 1,909,623 | McDowell | May 16, 1933 |
| 1,920,947 | Armstrong | Aug. 1, 1933 |
| 1,925,618 | Wetmore | Sept. 5, 1933 |
| 1,960,346 | Myers | May 29, 1934 |
| 1,960,626 | Everett | May 29, 1934 |
| 2,026,790 | Mankoff | Jan. 7, 1936 |
| 2,144,533 | Hazle, Jr. | Jan. 17, 1939 |
| 2,291,815 | Korum | Aug. 4, 1942 |
| 2,339,961 | Stevenson | Jan. 25, 1944 |